United States Patent [19]

Nishiyama et al.

[11] Patent Number: 4,907,172

[45] Date of Patent: Mar. 6, 1990

[54] CHARACTER GENERATOR WITH CLOCKING CIRCUITRY

[75] Inventors: Masaaki Nishiyama, Toyohashi; Takashi Kadono, Toyokawa, both of Japan

[73] Assignee: Minolta Camera Kabushiki Kaisha, Osaka, Japan

[21] Appl. No.: 176,734

[22] Filed: Apr. 1, 1988

Related U.S. Application Data

[62] Division of Ser. No. 813,657, Dec. 26, 1985, Pat. No. 4,847,787.

[30] Foreign Application Priority Data

| Dec. 28, 1984 | [JP] | Japan | 59-281252 |
| Jan. 10, 1985 | [JP] | Japan | 60-3102 |
| Jan. 10, 1985 | [JP] | Japan | 60-3103 |
| Jan. 14, 1985 | [JP] | Japan | 60-4763 |
| Jan. 14, 1985 | [JP] | Japan | 60-4764 |
| Jan. 14, 1985 | [JP] | Japan | 60-4765 |

[51] Int. Cl.⁴ .................. H03K 21/02; H03K 21/10
[52] U.S. Cl. .................. 364/518; 307/271; 331/10; 364/521
[58] Field of Search ............ 364/521, 518; 307/409, 307/412, 582, 590, 269–271; 331/10, 175, 177 R

[56] References Cited

U.S. PATENT DOCUMENTS

| 4,024,464 | 5/1977 | Underhill et al. | 331/10 |
| 4,525,685 | 6/1985 | Hesselberth et al. | 331/10 |
| 4,646,259 | 2/1987 | Lincoln et al. | 364/900 |
| 4,654,604 | 3/1987 | Smith et al. | 331/10 |
| 4,656,649 | 4/1987 | Takahashi | 307/271 |

*Primary Examiner*—Gary V. Harkcom
*Assistant Examiner*—H. R. Herndon
*Attorney, Agent, or Firm*—Price, Gess & Ubell

[57] ABSTRACT

Clocking circuitry for a character generator wherein a control microprocessor controls character generated by hardwired logic through an interface microprocessor, the clocking circuitry including an oscillator which supplies an output to a divider which supplies a reduced frequency signal to the control microprocessor. The output of the oscillator is also supplied to the output of a timing controller. The timing controller further receives a print signal from the interface microprocessor and supplies a plurality of timing signals to the hard wired logic character generator.

2 Claims, 6 Drawing Sheets

CHARACTER GENERATOR WITH CLOCKING CIRCUITRY

This is a division of application Ser. No. 813,657, filed Dec. 26, 1985 now U.S. Pat. No. 4,847,787.

BACKGROUND OF THE INVENTION

1. Field of the Invention

The present invention relates to a character generator which generates dot images of characters and others.

2. Description of the Prior Art

A character generator of the character map method is used to transmit a dot image of characters and others to various dot-image printers. (The characters and others include, for example, the alphabet, arabic numerals, kanas (the Japanese alphabet), chinese characters and symbols, and hereinafter they are referred to as characters.) When the characters in a text are designated, the character generator gains access to a font memory so that each character is transformed into dot arrays to form a dot image in correspondence thereto and the dot matrix array is transmitted to a dot-image printer.

FIG. 1 is a block diagram of an example of a basic character generator system. A character generator 1 is controlled by a CPU 2. When a text 3 to be printed is transmitted, the CPU 2 sends to the character generator 1 both control data such as carriage return and page end for the control of printing and character data for the access of the font memory 4 in correspondence to the characters in the text 3. The font memory 4 is a memory which stores dot images of fonts of characters. The interface 5 of the character generator 1 reads each of dot images of the characters successively in unit of one byte from the font memory 4, and transmits them to a dot-image printer 6. The interface 5 also transmits control data. The printer 6 prints the data received from the character generator 1, and reproduces the text 3 as dot image.

A font consists of a dot pattern of for example 32×32 dots. FIG. 2 shows character A as a dot pattern of 32 raws (4 byte raws) ×32 lines. The horizontal width of a font can be varied within 32 dots in the proportional processing where the width of a font is allowed to vary. One line of a dot pattern in the horizontal direction is divided and stored in unit of one byte (a plurality of bits, for example 8 bits).

In the font memory shown in FIG. 3, the dot pattern of a font is stored into four memories ROM1, ROM2, ROM3 and ROM4 each numbered corresponding to a byte row after the designated address $A_n$. A dot string of one byte designated at the m-th and k-th row in the dot pattern of X byte raws x Y lines in FIG. 2 is stored at the address $A_n+(m-1)$ of the k-th ROM.

On printing characters, the addresses in the font memory which correspond to the characters in the text are designated successively, and the data read out from the font memory are transmitted synchronously with the timing of the data transfer to the printer.

Fast processing is required more and more on a character generator.

However, a prior art character generator should act synchronously as a whole with a data request signal from a printer. For example, in case of a dot pattern of 24×24 dots, a font memory should be read three times (for three bytes) in correspondence with one data request, as follows: (1) The first access of the font memory (the load of the first byte), (2) the data transfer of the first byte, (3) the second access of the font memory (the load of the second byte), (4) the data transfer of the second byte, (5) the third access of the font memory (the load of the third byte), and (6) the data transfer of the third byte. This processing steps proceed serially so that the processing takes much time. Therefore, it is difficult for the processing to make much faster. The composition of the circuit of a character generator also is complex because the whole processing should be taken into account.

Recently, the resolution of a font becomes higher according to the increase in the resolution of a printer, while the characters becomes diversified. This tendency will continue in the future. Then, the constitution of a character may not necessarily be in unit of one byte. Further, the proportional processing for varying the width of a font in each character will be adopted more and more.

However, the transfer of a data being not divided in unit of byte is difficult in a prior art character generator because the access of a font memory and the transmittance of a 1-byte data to the printer are proceeded almost synchronously with each other. Further, a CPU, a font memory and a RAM are constructed so that data are accessed in unit of one byte ordinarily. Thus, the data transfer to the printer is difficult to make faster in a prior art character generator.

A prior art character generator has a text buffer where a text is stored as character codes. In this method of storing a text, when fonts of small numbers such as the alphabet and the kana characters (for example, of 1-byte code) and those of large numbers such as chinese characters (for example, of 2-byte code) are used together, the structure of a text buffer becomes complex because of the necessity of changing the two different kinds of character codes of 1-byte and 2-byte.

The increase in the dot number of a dot pattern per character in the horizontal direction according to the increase in the resolution of a printer increases the content of a font memory, and this accompanies the increase in ineffective memory area (waste area) which cannot be neglected.

SUMMARY OF THE INVENTION

An object of the present invention is to provide a character generator which can generate dot pattern of characters fast.

Another object of the present invention is to provide a character generator which can generate dot patterns each of which are not necessarily defined in unit of byte.

A further object of the present invention is to provide a character generator which can process different kinds of characters simply.

A character generator according to the present invention comprises (1) a font memory means of storing a dot pattern of fonts, (2) a first-in first-out memory means of loading a dot pattern data in unit of byte successively, which memory means generates a load request signal when the memory space has empty spaces, (3) an input control means of accessing a dot pattern of a font to be printed in the font memory means and of transmitting a dot array data of one byte to the first-in first-out memory means on the acceptance of the load request signal, and (4) an output control means of sending an output request signal to the first-in first-out memory means to receive a dot array data from the first-in first-out memory means, and of transmitting the dot array data to a dot-image printer synchronously with a load request signal from the dot-image printer.

BRIEF DESCRIPTION OF THE DRAWINGS

Other objects and advantages of the invention will be apparent from the following description, the appending claims and the accompanying drawings:

PREFERRED EMBODIMENT OF THE INVENTION

(a) Organization of Font Memory

Figure 1:
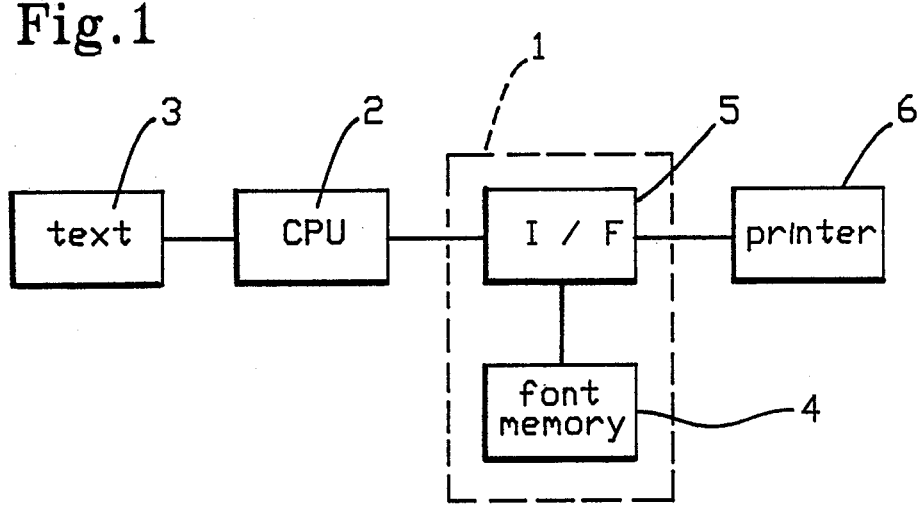
FIG. 1 is a block diagram of a character generator system.
Figure 2:
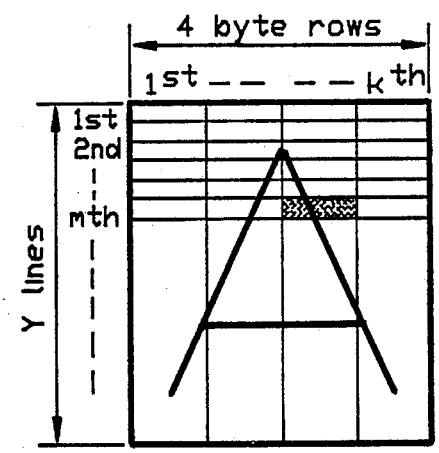
FIG. 2 is a diagram of an example of a dot pattern of a font for A.
Figure 4:
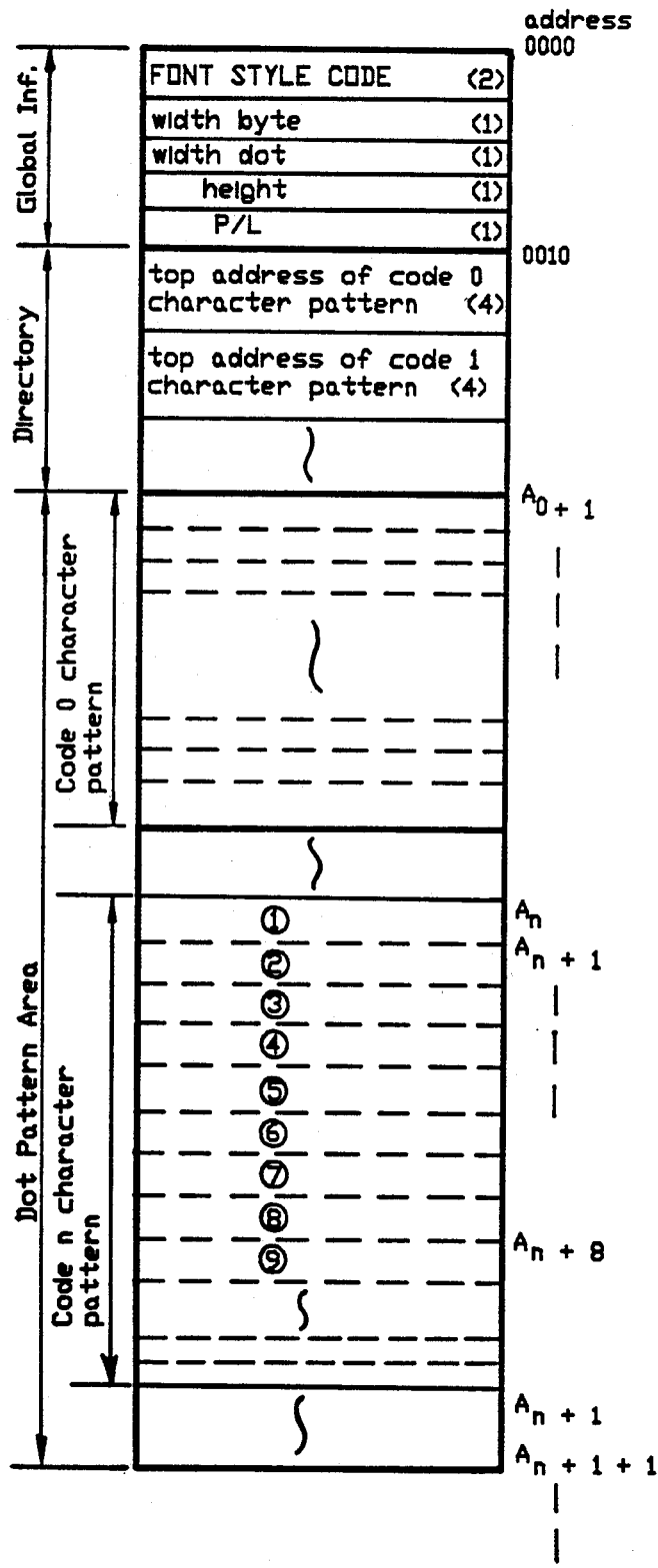
FIGS. 4 and 5 are each a memory map of a font memory according to an embodiment of the invention.

A font to be printed in a dot image printer consists of a pattern of 32×32 dots, for example, as shown in FIG. 2, wherein a character A of the alphabet is displayed as a dot pattern of thirty two raws (four byte raws of width) and thirty two lines of height. The width of a font can vary within the limit of thirty two dots.

composed of a single ROM in this embodiment shown in FIG. 4.

However, the font memory may consist of a plurality of ROMs.

FIG. 4 shows an address map of the font memory wherein the dot patterns of fonts are stored after the top address $A_n$. The global informations (font style code, byte width, dot width, etc.) are stored in the first sixteen addresses. After address 0016 in hexadecimal notation, the dot patterns of the fonts are stored after the top addresses successively.

Figure 3:
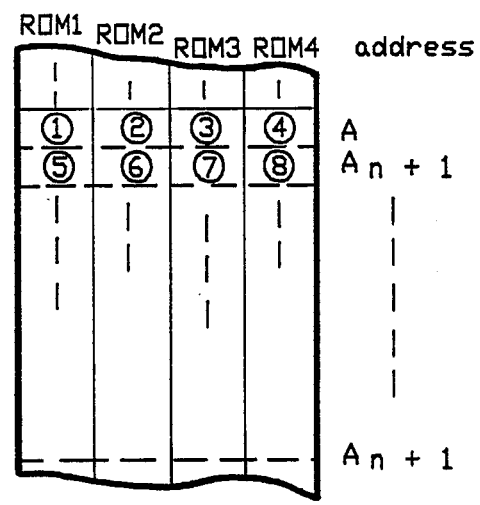
FIG. 3 is a memory map of a prior art font memory.

The dot patterns may be stored in parallel in four memories, ROM1, ROM2, ROM3 and ROM4, as in a prior art font memory shown in FIG. 3. In this case, the memories are numbered in correspondence with the order of four byte raws of dot pattern so that the dot string of m-th line and k-th byte raw is stored in an address $A_n+m$ in the memory k-th ROM.

Table 1 shows the requisite capacity of memories used in unit of byte and the construction of ROMs which should be used to construct a font memory for a font memory according to an embodiment of the present invention as well as for a prior art font memory for comparison and for three kinds of dot pattern of 16×16 dots, 24×24 dots and 32×32 dots each for an alphanumeric character and symbol set, an alphanumeric and kana character and symbol set, a chinese character set of the first kind and that of the second kind.

It is clear that the requisite number of font ROMs decreases when compared with that of the prior art font memory. This effect is remarkable especially for the alphanumeric character and symbol set and the alphanumeric and kana character and symbol set each having a small number of characters.

TABLE 1

| | Content and structure of font memory | | | | | |
|---|---|---|---|---|---|---|
| | 16 × 16 dots | | 24 × 24 dots | | 32 × 32 dots | |
| | prior art | invention | prior art | invention | prior art | invention |
| alphanumeric character and symbol set (118 characters) | 1888 bytes × 2 64K ROM × 2 | 3776 bytes 64K ROM × 1 | 2832 bytes × 3 64K ROM × 3 | 8496 bytes 64K ROM × 2 | 3776 bytes × 4 64K ROM × 4 | 15104 bytes 64K ROM × 2 |
| alphanumeric and kana character and symbol set (182 characters) | 2912 bytes × 2 64K ROM × 2 | 5824 bytes 64K ROM × 1 | 4368 bytes × 3 64K ROM × 3 | 13104 bytes 64K ROM × 2 | 5824 bytes × 4 64K ROM × 4 | 23296 bytes 64K ROM × 3 |
| chinese character set of the first level (3418 characters) | 5488 bytes × 2 256K ROM × 4 1M ROM × 2 | 109376 bytes 256K ROM × 3 1M ROM × 1 | 82032 bytes × 3 256K ROM × 9 1M ROM × 3 | 246096 bytes 256K ROM × 8 1M ROM × 2 | 109376 bytes × 4 256K ROM × 16 1M ROM × 4 | 437504 bytes 256K ROM × 13 1M ROM × 4 |
| chinese character set of the second level (3418 + 3384 = 6802 characters) | 108832 bytes × 2 256K ROM × 8 1M ROM × 2 | 217664 bytes 256K ROM × 7 1M ROM × 2 | 163248 bytes × 3 256K ROM × 15 1M ROM × 6 | 489744 bytes 256K ROM × 15 1M ROM × 4 | 217664 bytes × 4 1M ROM × 8 | 870656 bytes 1M ROM × 7 |

(the number before ROM designates the number of the bits of the ROM)

Figure 5:
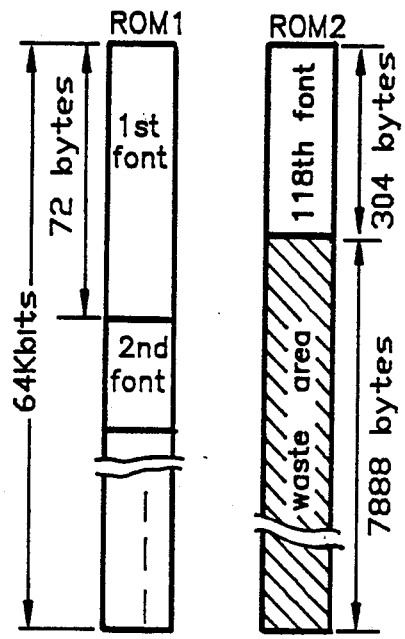
Figure 6:
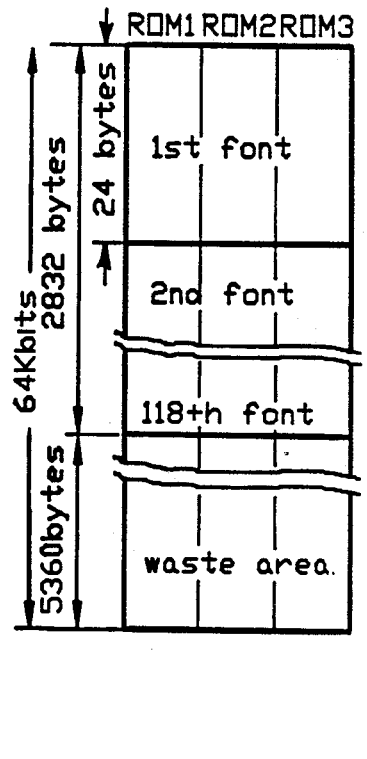
FIG. 6 is a memory map of a prior art font memory.

The dot pattern of an n-th font in a text is stored in a font memory (a ROM) after the top address $A_n$ successively. (Refer the construction of the memory space shown in FIG. 4.) That is, a dot pattern of a font is divided into X byte raws of width and Y lines of height (now, X=4, and Y=32), and the dot array of a byte of m-th line and k-th byte raw is stored in an address $A_n+(m-1) \times X+(k-1)$ in the font memory. If the byte width X is kept constant, $A_n=A_O+n (X \times Y)$ wherein $A_O$ is the top address of the memory space for data storage of character patterns. The font memory is For example, FIGS. 5 and 6 display an example of the construction of font memory of this embodiment and of prior art font memory, respectively, of dot pattern of 24×24 dot of the alphanumeric and symbol set, where the hatched area designates waste area. The font memory of this invention consists of two 8 k-byte ROMs, whereas that of prior art font memory needs three 8 k-byte ROMs. In other words, the former can consist of ROMs in a smaller number by one than the latter, or the former requires a smaller capacity of ROM.

In a font memory according to the present embodiment of the invention, the dot pattern of each font is stored successively after the corresponding top address for the font. Therefore, the memories used for a font memory can be used efficiently, and the capacity of a font memory used can be made smaller.

(b) Storage in Text Buffer

The top address in a font memory of each character which consists of a text is written into a text buffer in this embodiment. As shown in Table 2, the data stored in the buffer consists of twenty four bits (TD0 to TD23), and it contains both control data to control the character data and font address data to designate the address in the font memory. A data in the text buffer is decided to be either a control data or a font address data according as TD0 is one or zero.

TABLE 2

| TD- | control data | font address data | |
|-----|-------------|-------------------|---|
| 23 | FONT SELECT 1 | FFAD - 19 | |
| 22 | FONT SELECT 0 | FFAD - 18 | |
| 21 | PTLND 5 | FFAD - 17 | RAM5 |
| 20 | PTLND 4 | FFAD - 16 | |
| 19 | PTLND 3 | FFAD - 15 | |
| 18 | PTLND 2 | FFAD - 14 | |
| 17 | PTLND 1 | FFAD - 13 | RAM4 |
| 16 | PTLND 0 | FFAD - 12 | |
| 15 | | FFAD - 11 | |
| 14 | LPDTD 6 | FFAD - 10 | |
| 13 | LPDTD 5 | FFAD - 9 | RAM3 |
| 12 | LPDTD 4 | FFAD - 8 | |
| 11 | LPDTD 3 | FFAD - 7 | |
| 10 | LPDTD 2 | FFAD - 6 | |
| 9 | LPDTD 1 | FFAD - 5 | RAM2 |
| 8 | LPDTD 0 | FFAD - 4 | |
| 7 | YBAI | FFAD - 3 | |
| 6 | YBAI | FFAD - 2 | |
| 5 | PE (page end) | FFAD - 1 | RAM1 |
| 4 | CR (carriage return) | FFAD - 0 | |

TABLE 2-continued

| TD- | control data | font address data | |
|-----|-------------|-------------------|---|
| 3 | PTBTD 2 | | |
| 2 | PTBTD 1 | | RAM0 |
| 1 | PTBTD 0 | | |
| 0 | 1 | 0 | |

A font address data is stored as a 20-bit data (FFAD0-FFAD19) from TD4 to TD23.

A control data contains various kinds of data for control. Three bits TD1 to TD3 is a binary data (PTBTD0 to PTBTD2) to display the width (number in unit of byte) of a font in the horizontal direction. Bits TD4 and TD5 show a signal for carriage return (CR) and for page end (PE), respectively, while bits TD6 and TD7 display a signal TBAI and a signal YBAI for doubling a font in the horizontal and vertical directions, respectively. Seven bits TD8 to TD14 show a signal LPDTD0 to LPDTD6 of the number of print lines which compose a character line. (For example, a font shown in FIG. 2 has Y print lines.) Six bits TD16 to TD21 display a binary number PTLND0 to PTLND5 which designates the height of a character in unit of dot. Two bits TD22 and TD23 show a signal FONT SELECT 0 and FONT SELECT 1 for selecting a font memory respectively. As shown below in FIG. 9, a 24-bit data TD0 to TD23 is stored in a text buffer by four bits in six dynamic RAMs (RAM0 to RAM5) of 4 bits ×16 k words.

Table 3 shows an example of the content of a text buffer. The first data of the first character line is a control data (TD0=1) for the first character line. In the following addresses, font address data (TD0=0) of the characters consisting of the first character line are stored successively. After the font address data of the last character, a control data (TD0=1) for the instruction of carriage return (TD4=1) is stored.

TABLE 3

Content of text buffer

| | text buffer data | | | | | | |
|---|---|---|---|---|---|---|---|
| | 23 22 21 20 | 19 18 17 16 | 15 14 13 12 11 10 9 8 | 7 6 5 4 | 3 2 1 0 | | |
| top of page ↓ first character line ↓ | FS | PTDTD5~0 | X LPDTD6~0 | YT 00 | PTBTD 1 | | |
| | font address (first character) | | | | | 0 | |
| | font address (second character) | | | | | 0 | |
| | ↓ | | | | | | |
| | font address (last character) | | | | | 0 | |
| | | | | 01 | 1 | | |
| ↑ second character line ↓ | FS | PTDTD5~0 | X LPDTD6~0 | YT 00 | PTBTD 1 | | |
| | font address (first character) | | | | | 0 | |
| | font address (second character) | | | | | 0 | |
| | ↓ | | | | | | |
| ↓ last character line ↓ | font address (last character) | | | | | 0 | |
| | | | | 01 | 1 | | |

TABLE 3-continued

| | | | | | | | |
|---|---|---|---|---|---|---|---|
| new page first character line | FS | PTDTD5~0 | ⋈ | LPDTD6~0 | YT|00 | PTBTD |1|
| | font address (first character) | | | | | | 0 |
| | font address (second character) | | | | | | 0 |
| ↓ | ↓ | | | | | | ↓ |

Next, a control data (TD0=1) for the second character line is stored. Then, font address data (TD0=0) of each of the characters consisting of the second character line are stored successively. After the font address data of the last character is stored, a control data for the instruction of carriage return (TD4=1) is stored.

Similarly, control data and font address data are stored to the last character of the last character line in the first page.

Finally, a control data (TD0=1) for the instruction of page end (TD5=1) is stored.

Next, the contents in the following pages in the text are stored similarly.

Upon printing, a character line is decomposed into a plurality of print lines, that is, horizontal dot lines, and the print lines are printed successively to form a character line. A dot pattern of a print line is read from a font memory by generating the address for the access to the font memory from the top address stored in the text buffer as will be explained below.

A text buffer according to the embodiment of the invention stores top addresses of characters irrespective of the kind of the font set having different kind of character codes. Therefore, when font sets such as an alphanumeric and kana character and symbol set and a chinese character set of the second level are used at the same time, the electric circuit of a character generator can be made simple.

Further, a text buffer mentioned above is also appropriate for a font memory of a type shown in FIG. 4 as well as a prior art font memory as shown in FIG. 3.

An electric circuit of a text buffer will be explained in section (e).

(c) Character Generator

Figure 7:
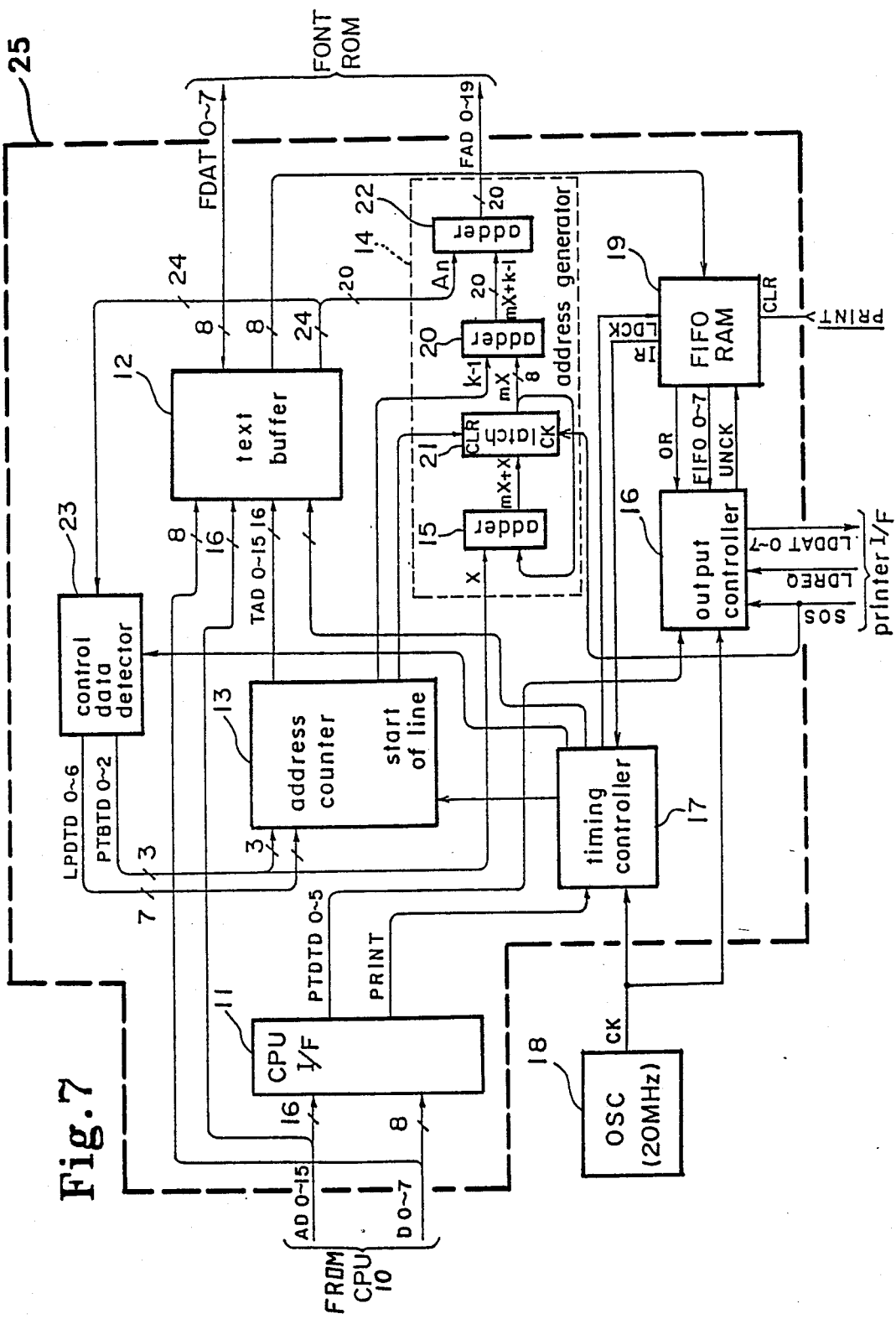
FIG. 7 is a circuit diagram of a character generator according to an embodiment of the invention.

FIG. 7 is a block diagram of a character generator of an embodiment according to the present invention. A font memory having an address map of the kind shown in FIG. 4 is adopted.

The address bus AD0 to AD15 and the data bus D0 to D7 of a microprocessor (CPU) 10 (FIG. 8) to control the character generator are connected both to an interface processor 11 and to a text buffer 12. The CPU 10 sends data including a text buffer data (refer Table 2) in correspondence to a text to be printed via the data bus D0 to D7.

Figure 8:
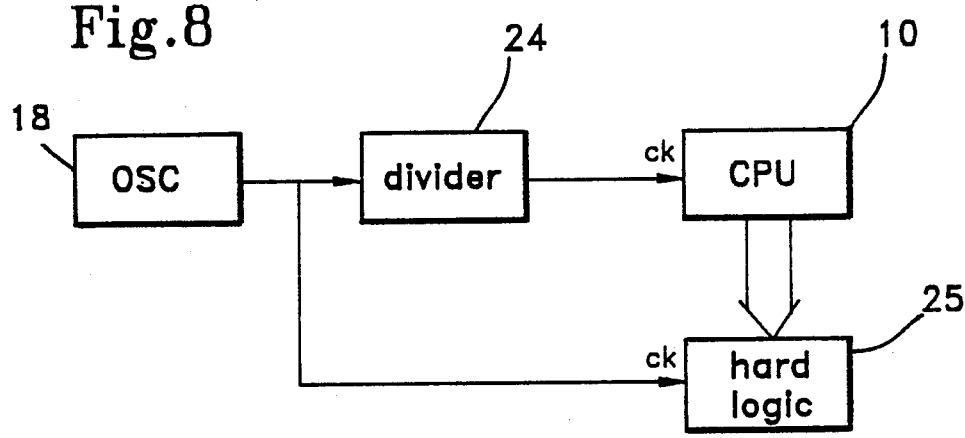
FIG. 8 is a block diagram of an oscillator circuit.

The interface processor 11 receives the data from the CPU 10, and it sends a binary data PTDTD0 to PTDTD5 of six bits, which shows the number of the dots of a font in the horizontal direction, and it sends a PRINT signal to a timing controller 17 for the instruction of printing. The binary data PTDTD0 to PTDTD5 is defined for each font in the proportional processing where the width of a font varies in each font. An oscillator 18 sends square wave of 20 MHz as clock signals CK both to the timing controller 17 and to an output controller 16. The clock signals of the CPU 10 is also provided via a divider 24, as shown in FIG. 8, in order to save the number of expensive crystal oscillator. That is, a signal oscillator 18 provides clock signals of a lower and a higher frequencies to the CPU 10 and to the hard logic 25 of the character generator shown in FIG. 7, respectively.

The timing controller 17 sends a timing signal to the address counter 13 and the text buffer 12, and also a data input signal LDCK to the FIFO (First-In First-Out) RAM 19 when it receives an input ready signal IR from the FIFO RAM 19; the signal IR shows that a data can be written into the FIFO RAM 19 because of the occurrence of spaces in the FIFO memory 19.

When the address counter 13 receives from the timing controller 17 a timing signal indicating that the FIFO RAM 19 has spaces, it sends the number k−1 of the width in unit of byte in the horizontal direction to an adder 20, and also a signal TAD0 to TAD15 for the access to the text buffer 12. Further, it sends a start-of-line signal to a latch 21 when the print line to be printed is the top of the print lines in a character line.

The text buffer 12 stores data from CPU 10 as shown in Table 3 (refer section (b)). When the FIFO RAM 19 has spaces, the text buffer 12 receives a signal from the timing controller 17 and sends to an adder 22 a 20-bit data which gives the top address $A_n$ of a font to be printed. The text buffer 12 is connected to a 1-byte parallel data FDAT0 to FDAT7 from the font memory, and it sends the parallel data to the FIFO RAM 19 if necessary.

A control data detector 23 receives a data from the text buffer 12 and detects a control data from the data stored in the text buffer 12, while it sends a data LPDTD0 to LPDTD6 to the address counter 13 and a data PTBTD0 to PTBTD2 to the address counter 13 and to an adder 15.

The address generator 14 consists of adders 15, 20, 22 and a latch 21. The output signal of the adder 15 is sent to the latch 21, and the output signal of the latch 21 is given to one of the input terminals of the adders 20, 15. An SOS (Start of Scan) signal which indicated the start of scan is sent from a printer interface (not shown) to the CK terminal of the latch 21 on printing each print line. The output terminal for twenty bits of the adder 20 are connected to one of the input terminals of the adder 22.

The address generator 14 generates an address FAD0 to FAD19 from the top addresses of fonts stored in the text buffer 12 in order to get access to a dot pattern to be printed in the font memory. Details will be given in Section (d).

The FIFO RAM 19 is cleared by a PRINT signal from the interface 11. (It cannot be cleared during printing.) When the FIFO RAM 19 has spaces, it sends a signal IR to the timing controller 17, and, when it receives an LDCK signal, it stores a 1-byte data sent from the font memory via the text buffer 12. On the other hand, when the FIFO RAM 19 has spaces to be loaded, it sends and output ready signal OR to the output controller 16, and when it receives a UNCK signal which requires a data, it sends a 1-byte data FIFO0 to FIFO7 in the order written in the memory. Thus, data to be printed are written into the FIFO memory 19 with no synchronization with the transmittance of data to the printer when the FIFO RAM 19 has spaces.

The output controller 16 sends a data LDDAT0 to LDDAT7 received from the FIFO RAM 19 to the printer interface (not shown) when it receives an SOS signal and an LDREQ signal to require the load of a 1-byte print data.

In a character generator of an embodiment according to the invention, when the FIFO RAM 19 has spaces, a bit data to be sent to the printer is read from the font memory and is loaded in the FIFO RAM 19. When the output controller 16 accepts an LDREQ signal, it transmitts the data loaded from the FIFO RAM 19 to the printer. In other words, the FIFO RAM 19 is interposed between the font memory and the output controller 16 so that the reading of a bit-data from the font memory is not needed to be synchronized with the transmittance of a bit-data to the printer. Therefore, the data processing for the printing becomes faster. Further, the circuit structure of a character generator becomes simple. The above-mentioned advantages are especially effective for the proportional processing.

(d) Action of Address Generator

As explained in section (b), the text buffer 12 stores only the top addresses of the characters in a text. Therefore, when the characters are generated by the character generator according to the embodiment of the invention, it is required to generate the addresses of the font memory to be accessed successively from both the top address $A_n$ stored in the text buffer 12 and the data of the position (m, k) in the font (see FIG. 2). For the fast processing (for example, the access period of 1.3 μs), the generation of the addresses should be processed preferably not by the software but by the hardware.

The text buffer 12 stores only the top addresses of fonts. Therefore, the data of the dot pattern of each print line should be read out from the font memory on printing by accessing each of actual addresses at each of which the dot pattern of the font of the print line is stored. The address generator 14 receives a data indicating a top address $A_n$ of each font from the text buffer 12, the order of the line m derived from SOS signal send from the printer at the start of printing of each print line, data (k−1) indicating the order of byte raw of the dot patterns of each font from the address counter 13, and a horizontal byte number X (in this embodiment, X=4) from the control data detector 23. Then, the address generator 14 calculates an address $A_n+(m-1)+(k-1)$ (refer FIG. 2), and sends as 20-bit data FAD0 to FAD19 in order to get access to the font memory. In other words, a part composed of the adder 15 and the latch 21 gives the second term (m−1) X when a clock SOS is received per each print line, and the third term (k−1) is added to the second term by the adder 20 and the first term $A_n$ is further added by the adder 22. Thus, each full address for the access of font memory is generated successively.

The address generator 14 acts as follows. Upon printing the first print line (m=1) of the first character line, the latch 21 is cleared first by a signal from the address counter 12 so that the output signal ((m−1)X) becomes zero. As to the first character, its top address $A_a$, its horizontal byte number X and k−1=0 (the first byte) are sent from the text buffer 12, the control data detector 23 and the address counter 13, respectively. Then, the top address $A_a$ appears at the output terminal of the adder 22. After the access of the first byte is over, the address counter 13 adds to the number of byte raw k by one so that the font address becomes $A_a+1$. Similarly, k is increased successively till the access is repeated as many times as the horizontal byte number X of the first character.

Next, the address counter 13 puts the number of byte raw k−1 back to zero again, and the text buffer 12 gives the top address $A_b$ of the second character. Then, the output signal of the adder 22 gives the top address $A_b$. After the access of the first byte is over, the address counter 13 increases k by one so that the font address becomes $A_b+1$. Similarly, k increases successively till the access is repeated on as many as times as the horizontal byte number X of the second character.

This procedure is continued till the last character. Thus, the access of all the dot pattern of a print line completes.

After the access of the first print line is completed, the printer gives a clock signal SOS to the latch 21 to indicate the start of the next print line (m=2). As to the first character of the second print line, X is added to the latched value (m−1)X =OX 0 which appear just before the clock signal SOS is provided so that the output signal of the latch 21 becomes $0+X=(0+1)X=1X$. Then, the output signal of the adder 20 becomes $X+(k-1)$, and that of the adder 22 becomes $A_b+X+(k-1)$. By designating the top address $A_b$ of each font and the byte raw k−1, the dot pattern of the second print line can be accessed similarly to that of the first one.

All the dot pattern of one character line can be read out by repeating the above-mentioned procedure on as many times as the vertical line number Y of a font.

Figure 9:
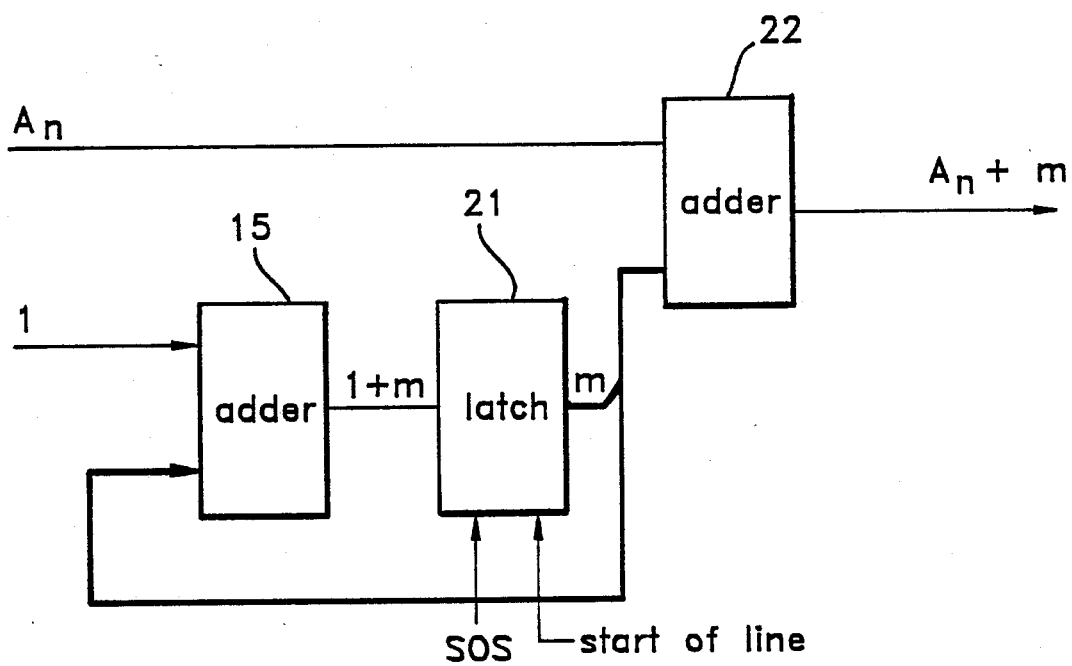
FIG. 9 is a circuit diagram of an address generator according to an embodiment of the invention.

FIG. 9 shows another address generator for the prior art font memory shown in FIG. 3. The differences of this address generator from that shown in FIG. 7 is as follows: A data k−1 is provided as a ROM select signal in order to select a font ROM among the ROMk's. The adder 20 is omitted because of no need of adding k−1. Then, the address provided by the adder 22 is $A_n+m$.

The address generators shown in FIGS. 7 and 9 are used for generating addresses for the access of a font memory when applied to a character generator which makes use of a text buffer wherein top addresses of fonts are stored.

(e) Text Buffer

Figure 10:
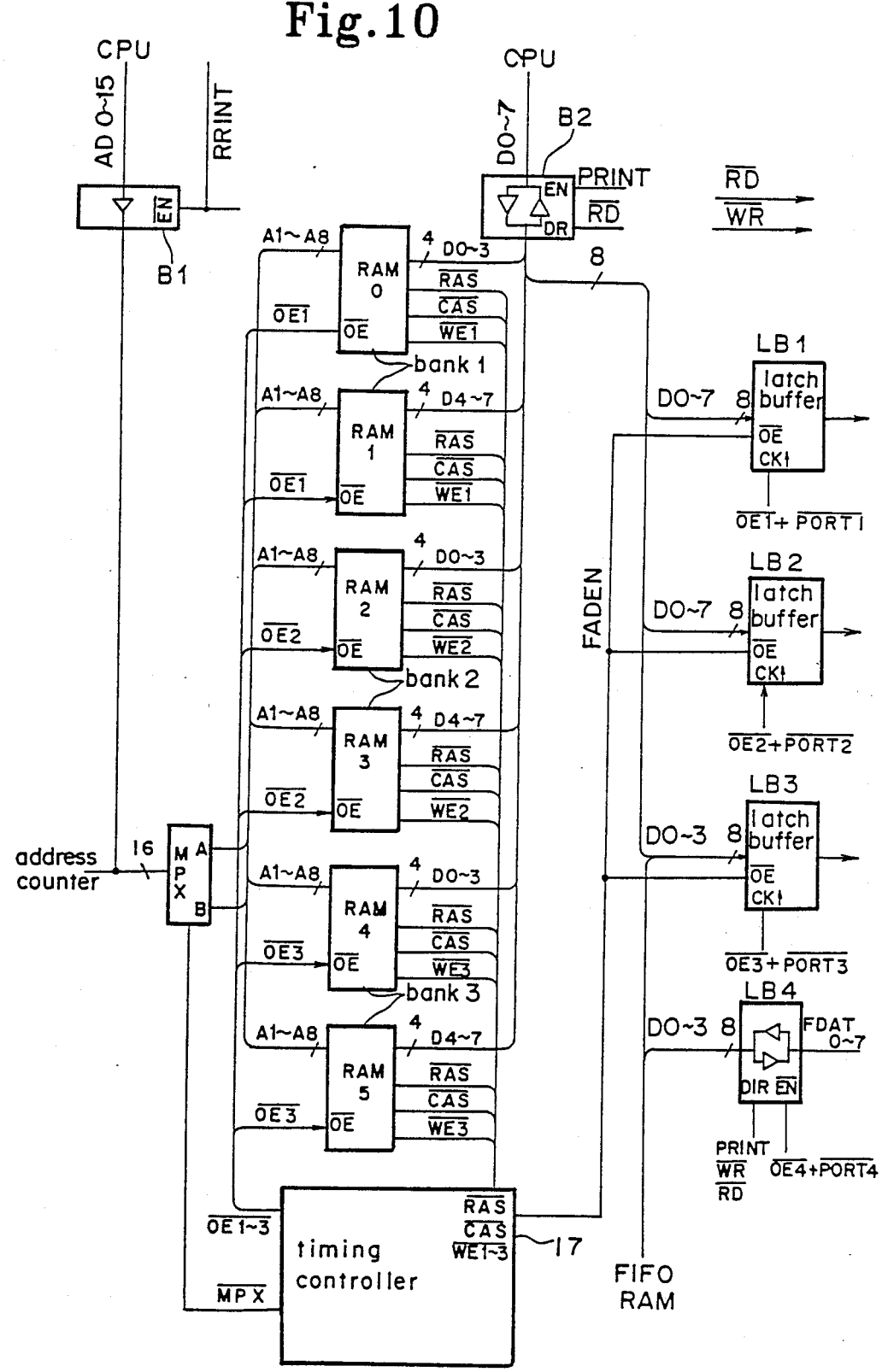
FIG. 10 is a circuit diagram of a text buffer according to an embodiment of the invention.

FIG. 10 shows a block diagram of the text buffer of an embodiment according to the invention. Six dynamic RAMs (RAM0, RAM1, . . . , RAM5) of 4 bit×16 k words construct three banks of 8 bit ×16 k words in pairs; Bank 1 consists of RAM0 and RAM1, bank 2 consists of RAM2 and RAM3, and bank 3 consists of RAM4 and RAM5.

The address bus AD0 to AD15 of CPU 10 (not shown) for controlling the character generator is connected to a multiplexer MPX via a buffer B1. The input terminals of the multiplexer MPX are also connected to the output terminals TAD0 to TAD15 of the address counter 13. An output enable terminal $\overline{EN}$ of the buffer B1 receives a PRINT signal which becomes low level on printing. The multiplexer MPX sends an 8-bit address data A1 to A8 through the A or B terminal to the address terminals of RAM0, RAM1, ..., RAM5, according to a select signal $\overline{MPX}$ provided by timing controller 17. On the other hand, the data bus for D0 to D7 of the CPU is connected via a bi-directional buffer B2 to each of the data terminals of two RAMs of each bank after divided into two groups of four bits D0 to D3 and D4 to D7, respectively, and further to the data terminals of latch buffers LB1, LB2, LB3 for the output and of a bi-directional latch buffer LB4. (As for the latch buffer LB3, only four bits D0 to D3 are connected.) An enable terminal EN of the bi-directional buffer B2 receives the PRINT signal, while its DR terminal for controlling the directions thereof receives an RD signal indicating to read out a data.

The timing controller 17 signals OE1, OE2 and OE3 to the output enable terminal $\overline{OE}$ of each of RAMs in bank 1, in bank 2 and in bank 3, respectively. Similarly, it gives signal WE1, WE2 and WE3 to the input write enable terminal $\overline{WE}$ of each of RAMs in each bank. The $\overline{RAS}$ and $\overline{CAS}$ terminals of the timing controller 17 are each connected to the counterparts of each RAM.

The CPU 10 accesses the RAMs in unit of one bank (eight bits), while the address bus TAD0 to TAD15 of the address counter 13 accesses all the RAMs (twenty four bits) at the same time.

The latch buffers LB1, LB2 and LB3 send a 20-bit top address $A_n$ of a font to the adder 22. The output enable terminals $\overline{OE}$ of each latch buffer LB1, LB2, LB3 receive a signal FADEN from the timing controller 17, which also provides an OE1+PORT1 signal, an OE2+PORT2 signal and an OE3+PORT3 signal to the CK terminal for the timing of latch buffers LB1, LB2 and LB3, respectively.

A bi-directional buffer LB4 is connected both to an 8-bit data bus FDAT0 to FDAT7 from the font memory (not shown) and to the data bus D0 to D7 and FIFO RAM 19 (not shown). The enable terminal $\overline{EN}$ of the buffer LB4 receives an OE4+PORT4 signal from the timing controller 17, and its DIR terminal which determines the direction of the output receives a PRINT signal, a $\overline{WR}$ signal or an $\overline{RD}$ signal. The signals FDAT0 to FDAT7 give an 8-bit pattern data read from the font memory, which data is sent to the FIFO RAM 19.

(f) Output Controller

Figure 11:
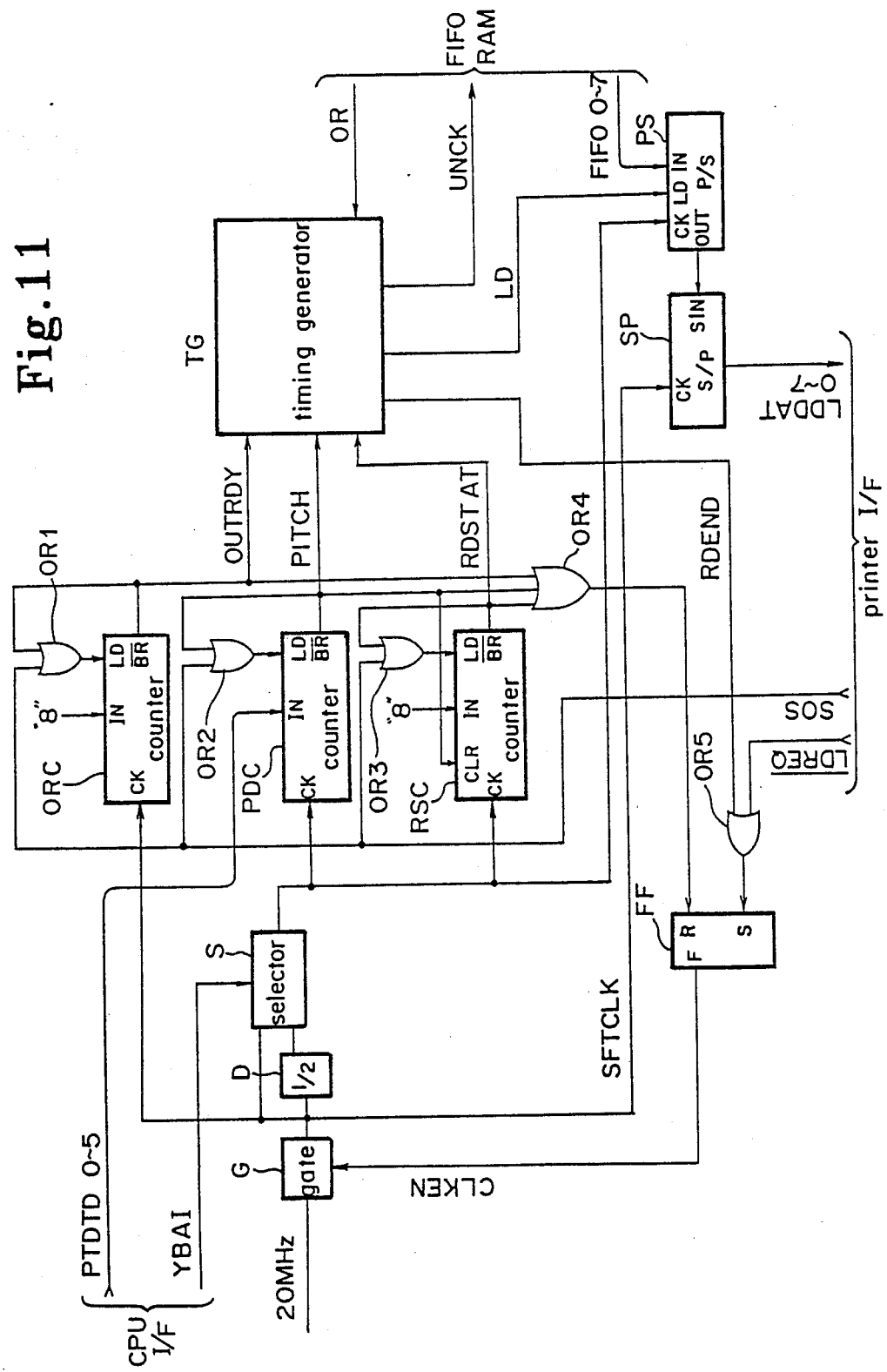
FIG. 11 is a circuit diagram of an output controller according to an embodiment of the invention.

FIG. 11 provides a circuit diagram of the output controller 16. The square wave of 20 MHz provided by the oscillator 18 is sent via a gate G both to a ½ divider D and to a selecter S, and further to each CK terminal of an out-ready-counter ORC and a serial-parrallel (S/P) shift register SP. The output terminal of the ½ divider D is connected to another input terminal of the selecter S. The selecter S sends square waves of 10 MHz when it accepts a YBAI signal for indicating to double the horizontal width of a character on printing; otherwise, it sends square waves of 20 MHz. The output terminal of the selecter S is connected to each CK terminal of a pitch-dot-counter PDC, a read-start-counter RSC and a parallel-serial (P/S) shift register PS. The enable terminal of the gate G is connected to the output terminal F of the flip flop FF, and the gate G provides the clock signal when the flip flop FF is set.

An SOS signal sent from the printer interface (not shown) in order to indicate the start of print of a print line is given to one of the input terminals of each of OR gates OR1, OR2 and OR3.

The preset input terminal IN of the out-ready-counter ORC receives a signal which corresponds to a numerical value "8". Its output terminal $\overline{BR}$ is connected to the other input terminal of the OR gate OR1, to that of the OR gate OR4 and to the input terminal for a signal OUTRDY of a timing generator TG. The output terminal of the OR gate OR1 is connected to the LD terminal of the out-ready-counter ORC in order to indicate the preset thereof.

A data PTDTD0 to PTDTD5 which shows the dot number of the width of a character to be printed is sent from the interface 11 to the preset input terminal IN of the pitch-dot-counter PDC. Its output terminal $\overline{BR}$ is connected to the other input terminal of the OR gate OR2, to the second input terminal of the OR gate OR4, to the clear terminal CLR of the read-start-counter RSC and to an input terminal of the timing generator TG. The output terminal of the OR gate OR2 is connected to the LD terminal of the pitch-dot-counter PDC in order to indicate the preset thereof.

The preset input terminal IN of the read-start-counter RSC also receives a signal which corresponds to a numerical value "8". Its output terminal $\overline{BR}$ is connected to the other of the input terminals of the OR gate OR3, to the third input terminal of the OR gate OR4 and to an input terminal for a signal RDSTAT of the timing generator TG. The output terminal of the OR gate OR3 is connected to the LD terminal of the read-start-counter RSC in order to indicate the preset thereof.

The output terminal of the OR gate OR4 is connected to the reset terminal of the flip-flop FF. The output terminal for signal RDEND of the timing generator TG for indicating the end of reading is connected to one of the input terminals of an OR gate OR5, while the load-require signal $\overline{LDREQ}$ from the printer interface is connected to the other of the input terminals of the OR gate OR5. The output terminal of the OR gate OR5 is connected to the set terminal S of the flip-flop FF.

The timing generator TG receives the OR signal from the FIFO RAM 19, while it sends the UNCK signal to the FIFO RAM 19 for reading out. (The UNCK signal is the RDSTAT signal provided by the read-start-counter RSC.) The timing generator TG sends an IN signal to the input terminal LD of the P/S shift register PS for the acception of a data from the FIFO RAM 19.

Each 1-byte data of data lines FIFO0 to FIFO7 of the FIFO RAM 19 is sent in parallel to the IN terminal of the P/S shift register PS. The data is sent serially from the OUT terminal of the P/S shift register PS to the SIN terminal of the S/P shift register SP.

Then, the S/P shift register SP transforms the serial data into a parallel 1-byte data, and sends the 1-byte data LDDAT0 to LDDAT7 to the printer interface. The dot number of the horizontal width of the font of a character (PTDTD0 to PTDTD5 in this embodiment) is not necessary given in unit of one byte. However, it is preferable for the fast processing to send data in unit of one byte when the output is requested by the load-request signal $\overline{LDREQ}$ from the printer. In such a processing, it is required sometimes to read a data from FIFO RAM 19 twice for one transmittance of a data to the printer. In this embodiment, the P/S shift register PS for transforming a 1-byte data sent from the FIFO RAM 19 into serial data and the S/P shift register SP for transforming the serial data into a 1-byte parallel data are used for this processing, and three kinds of counters ORC, RDC and RSC are provided for controlling the data transfer between the shift registers PS, SP and the FIFO RAM 19.

Each counter acts as follows:

The out-ready-counter ORC is preset at the value "8" at first, and the count decreases by one for each shift clock CK down to "0". When the count reaches "0", a preset signal is received again via the OR gate OR1, and the count becomes "8" again. When the count becomes "0" again, the flip flop FF is reset via the OR gate OR4 so as to stop the shift clock until the loading the data LDDAT0 to LDDAT7 of the S/P shift register SP is completed by the printer interface. When the load-request signal $\overline{\text{LDERQ}}$ is sent by the printer interface, the flip flop FF is set, and the shift clock CK is again received by the out-ready-counter ORC, and the above-mentioned processing is repeated.

The pitch-dot-counter PDC is preset at every font with the width dot number PTDTD0 to PTDTD5 of character to be read from the FIFO RAM 19. The count thereof is decreased by one for each data transfer from the P/S shift register PS to the S/P shift register SP. When the count reaches "0", the width dot number PTDTD0 to PTDTD5 of the next font to be printed is preset via the OR gate OR2. At the same time, the shift clock is stopped via the OR gate OR4 and the flip flop FF. Further, the read-start-counter RSC is cleared.

The read-start-counter RSC is preset at a numerical value "8", and the count thereof is decreased by one for every shift clock. When the count of this counter RSC or the pitch-dot-counter PDC reaches "0", this counter RSC is reset again with "8" via the OR gate OR3, and the shift clock is stopped by the OR gate OR4 and the flip flop FF. At the same time, the read-start-counter RSC sends an RDSTAT signal to the timing generator TG, which generates the UNCK signal in order to indicate reading out the data from the FIFO RAM 19.

When the timing generator TG receives from the FIFO RAM 19 an OR signal which indicates that a data in the FIFO RAM 19 is ready to be read out, it sends an LD signal to the P/S shift register PS in order to load the data from the FIFO RAM 19 thereto. The timing generator TG sends to the OR gate OR5 an RDEND signal which indicates the end of the load of the data from the FIFO RAM 19 to P/S shift register so that the shift clock is started again.

Table 4 shows an example of the action of the shift registers PS, SP and counters ORC, PDC, RSC. In this example, the dot width number (displayed in the left-side column) varies in succession of 16, 18, 20, 24 and 18. (In this example, YBAI signal is not applied to the selector S so that the common clock signal is given to the counters ORC, PDC, RSC and shift registers PS, SP.) The numbers in the P/S shift register column designate the serial order of the bits of a 1-byte data loaded in the P/S shift register PS among the horizontal dot arrays of a font. When the number of the bits of the input data is smaller than 8, it is shown by a blank. Each number in the S/P shift register column designates the serial number of the bits of a horizontal dot array of a font of a data loaded in the S/P shift register SP from the P/S shift register PS after the shift pulses as many as the number shown in the SFT column have been accepted. "OUT" which appears in the S/P shift register column shows that a 1-byte data can be sent to the printer after the count of the out-ready-counter ORC becomes "0". In the most right column, OUT READY, PITCH DOT and READ START designate the counts of the counter ORC, PDC and RSC, respectively. Arrows in the READ START shows that the read-start-counter RSC is cleared when the count of the pitch-dot-counter PDC becomes "0".

TABLE 4

| dot width | SFT | P/S shift register | S/P shift register | OUT READY | PITCH DOT | READ START |
|---|---|---|---|---|---|---|
| 16 |   | 1 2 3 4 5 6 7 8 |   | 8 | 16 | 8 |
|    | 8 |   | 1 2 3 4 5 6 7 8 | 0 | 8 | 0 |
|    |   |   | OUT | 8 |   | 8 |
|    |   | 9 10 11 12 13 14 15 16 |   | 0 | 0 | 0 |
|    | 8 |   | 9 10 11 12 13 14 15 16 | 0 | IS | 8 |
|    |   |   | OUT | 8 |   | 8 |
| 18 |   | 1 2 3 4 5 6 7 8 |   | 0 | 10 | 0 |
|    | 8 |   | 1 2 3 4 5 6 7 8 | 0 | 10 | 0 |
|    |   |   | OUT | 8 |   | 8 |
|    |   | 9 10 11 12 13 14 15 16 |   |   |   |   |
|    | 8 |   | 9 10 11 12 13 14 15 16 | 0 | 2 | 0 |
|    |   |   | OUT | 8 |   | 8 |
|    |   | 17 18 |   |   |   |   |
|    | 2 |   | 17 18 | 6 | 0 | 6 → 0 |
|    |   | 1 2 3 4 5 6 7 8 |   |   | 20 | 8 |
|    | 6 | 7 8 | 17 18 1 2 3 4 5 6 | 0 | 14 | 2 |
|    |   |   | OUT | 8 |   |   |
|    | 2 |   | 7 8 | 6 | 12 | 0 |
|    |   | 9 10 11 12 13 14 15 16 |   |   |   | 8 |
| 20 | 6 | 15 16 | 7 8 9 10 11 12 13 14 | 0 | 6 | 2 |
|    |   |   | OUT | 8 |   |   |
|    | 2 |   | 15 16 | 6 | 4 | 0 |
|    |   | 17 18 19 20 |   |   |   | 8 |
|    | 4 |   | 15 16 17 18 19 20 | 2 | 0 | 4 → 0 |
|    |   | 1 2 3 4 5 6 7 8 |   |   | 24 | 8 |
|    | 2 | 3 4 5 6 7 8 | 15 16 17 18 19 20 1 2 | 0 | 22 | 6 |
|    |   |   | OUT | 8 |   | 8 |
|    | 6 |   | 3 4 5 6 7 8 | 2 | 16 | 0 |
|    |   | 9 10 11 12 13 14 15 16 |   |   |   | 8 |
| 24 | 2 | 11 12 13 14 15 16 | 3 4 5 6 7 8 9 10 | 0 | 14 | 6 |
|    |   |   | OUT | 8 |   |   |
|    | 6 |   | 11 12 13 24 36 16 | 2 | 8 | 0 |
|    |   | 17 18 19 20 21 22 33 24 |   |   |   | 8 |
|    | 2 | 19 20 21 22 23 24 | 11 12 23 14 15 16 17 18 | 0 | 6 | 6 |

TABLE 4-continued

| dot width | SFT | P/S shift register | | | | | | | | S/P shift register | | | | | | | OUT READY | PITCH DOT | READ START |
|---|---|---|---|---|---|---|---|---|---|---|---|---|---|---|---|---|---|---|---|
| | 6 | | | | | | | | | | | 19 | 20 21 | 22 | 23 | 24 | OUT 2 | 0 18 | 0 8 |
| | 2 | 1 3 | 2 4 | 3 5 | 4 6 | 5 7 | 6 8 | 7 | 8 | 19 | 20 | 21 | 22 23 | 24 | 1 | 2 | 0 | 16 | 6 |
| 18 | 6 | 9 | 10 | 11 | 12 | 13 | 14 | 15 | 16 | | | 3 | OUT 4 5 | 6 | 7 | 8 | 8 2 | 10 | 0 8 |
| | 2 | 11 | 12 | 13 | 14 | 15 | 16 | | | 3 | 4 | 5 | 6 7 | 8 | 9 | 10 | 0 | 8 | 6 |
| | 6 | | | | | | | | | | | 11 | OUT 12 13 | 14 | 15 | 16 | 8 2 | 2 | 0 8 |
| | 2 | 17 | 18 | | | | | | | 11 | 12 | 13 | 14 15 OUT | 16 | 17 | 18 | 0 | 0 | 6 → 0 |

In the following, the processing of the second character with an 18-dot width and the third character with a 20-dot width will be explained according to Table 4. After the data of the first character with a 16 dot width has been loaded to the printer, the out-ready-counter ORC, the pitch-dot-counter PDC and the read-start-counter RSC are loaded with a numerical value "8", the dot width "18", and a numerical value "8", respectively. Then, a 1-byte data from the first to the eighth bit of the second character is loaded into P/S shift register from the FIFO RAM 19. The data are transferred to the S/P shift register SP according to following eight clock signals. Then, the count of the pitch-dot counter PDC becomes ten by eight successive subtractions. Because the S/P shift register SP has stored an 8-bit data to be transferred, the data are transmitted to the printer interface synchronously with the $\overline{LDREQ}$ signal sent from the printer. Next, a 1-byte data from the ninth bit to the sixteenth bit is loaded in the P/S shift register PS from the FIFO RAM 19. Then, the data is transferred to the S/P shift register SP according to following eight shift clocks. Therefore, the count of the pitch-dot-counter PDC becomes two by the eight subtractions. Because the S/P shift register SP has stored an 8-bit data to be transferred, the data is transmitted to the printer interface. Next, a 1-byte data including the seventeenth and the eighteenth bits are loaded in the P/S shift register PS from the FIFO RAM 19. In the data, the other six bits are meaningless. The data is transferred to the S/P shift register SP according to following two shift clocks. Therefore, the count of the pitch-dot-counter PDC becomes zero, and the read-start-counter RSC is cleared. Next, the dot width "20" of the following character is preset into the pitch-dot-counter PDC, and a numerical value "8" is preset into the read-start-counter RSC. On the other hand, the count of the out-ready-counter ORC becomes six.

Next, a 1-byte data from the first to the eighth bit of the third character is loaded in the P/S shift register PS. The data from the first to the sixth bit are transferred to the S/P shift register SP with following six shift clocks. Because the S/P shift register SP has stored an 8-bit data to be transferred, the data is transmitted to the printer interface. Then, the count of the pitch dot counter PDC becomes fourteen by six subtractions, and that of the read-start counter RSC becomes two. The remaining fifteenth and sixteenth bits are transferred to the S/P shift register SP according to the following two shift clocks. Then, the count of the pitch-dot-counter PDC becomes twelve by two substractions, and that of the out-ready-counter ORC becomes six. Next, a 1-byte data from the ninth to the eighteenth bit is transferred to the S/P shift register SP from the FIFO RAM 19. The data transfer processing proceeds similarly in the following.

When the dot array to be printed is not a multiple of a byte, a 1-byte data read from the font memory may include unnecessary bit data which should not be sent to the printer. In the output controller explained above, only necessary data in the parallel data loaded in the P/S shift register PS from the FIFO RAM 19 are transmitted serially to the S/P shift register SP according to the judging by the pitch-dot-counter PDC. When the output-ready-counter ORC detects that a bit data as many as one byte is loaded in the S/P shift register SP, the 1-byte data is transmitted to a printer. When the read-start-counter RSC detects that all data loaded in the P/S shift register PS are transmitted to the S/P shift register SP, a new parallel data is loaded in the P/S shift register from the FIFO RAM 19.

Thus, even when a dot array to be printed is not necessarily a multiple of a byte, the dot array data can be transmitted fast, that is, the printing speed can be made fast.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed as new:

1. In a character generator having a microprocessor for controlling character generation and a hard logic circuit means for performing the character generation under the control of the microprocessor, a clock means comprising:
   an oscillator means for providing a clock signal to the hard logic circuit means; and
   a divider means which is interposed between the oscillator means and the microprocessor for receiving said clock signals from said oscillator means and for providing a clock signal of reduced frequency to said microprocessor.

2. In a character generator having a control microprocessor for controlling character generation, and interface processor receiving address and data inputs from said control microprocessor and providing a print signal output, and a hard logic circuit means for performing the character generation under the control of the control microprocessor, a clock means comprising:

an oscillator means for providing a clock signal;
a timing controller included in said hard logic circuit means receiving said print signal and said clock signal as inputs and providing a plurality of timing signals for timing operation of said hard logic means; and
a divider means interposed between the oscillator means and the control microprocessor for receiving said clock signals from said oscillator means and for providing a clock signal of reduced frequency to said control microprocessor.

* * * * *